US012579808B2

(12) United States Patent
Biswas et al.

(10) Patent No.: US 12,579,808 B2
(45) Date of Patent: Mar. 17, 2026

(54) COMPUTERIZED SYSTEM AND METHOD FOR FINE-GRAINED EVENT DETECTION AND CONTENT HOSTING THEREFROM

(71) Applicant: YAHOO ASSETS LLC, New York, NY (US)

(72) Inventors: Topojoy Biswas, San Jose, CA (US); Avijit Shah, Sunnyvale, CA (US); Deven Santosh Shah, San Jose, CA (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 18/769,976

(22) Filed: Jul. 11, 2024

(65) Prior Publication Data

US 2024/0371162 A1     Nov. 7, 2024

Related U.S. Application Data

(63) Continuation of application No. 17/211,055, filed on Mar. 24, 2021, now Pat. No. 12,056,928.

(51) Int. Cl.
*G06V 20/40*        (2022.01)
*G06F 18/214*       (2023.01)
(Continued)

(52) U.S. Cl.
CPC ............ *G06V 20/42* (2022.01); *G06F 18/214* (2023.01); *G06V 20/47* (2022.01); *G06V 20/49* (2022.01); *G06V 20/63* (2022.01); *G11B 27/102* (2013.01); *H04N 21/8146* (2013.01);

*H04N 21/845* (2013.01); *G06V 20/44* (2022.01); *G06V 30/10* (2022.01); *G06V 2201/10* (2022.01)

(58) Field of Classification Search
CPC ........ G06V 20/42; G06V 20/47; G06V 20/49; G06V 20/63; G06V 20/44; G06V 30/10; G06V 2201/10; G06F 18/214; G11B 27/102; G11B 27/031; G11B 27/28; H04N 21/8146; H04N 21/845; H04N 21/23418; H04N 21/8456; H04N 21/854
See application file for complete search history.

(56) References Cited

U.S. PATENT DOCUMENTS 9,986,394 B1    5/2018  Taylor et al.
10,834,158 B1  11/2020  Bourgoyne et al.
(Continued)

*Primary Examiner* — Kyu Chae
(74) *Attorney, Agent, or Firm* — James J. DeCarlo; Greenberg Traurig, LLP

(57) ABSTRACT

The disclosed systems and methods provide a novel framework that provides mechanisms for performing cost-effective, accurate and scalable detection and recognition of fine-grained events. The framework functions by training high precision and high recall object/optical character recognition (OCR) models and aligning video frames to text commentaries of the videos (e.g., licensed play-by-play). The disclosed framework operates as a single algorithm that performs multimodal alignments between events/actions within videos and their prescribed text. Thus, the disclosed framework is able to scale to fine-grained action categories across different venues by delving into the key frames and key aspects of a video to identify particular actions performed by particular actors, thereby providing the novelty of fine-granted action detection and recognition.

20 Claims, 12 Drawing Sheets

(51) Int. Cl.

| | | |
|---|---|---|
| *G06V 20/62* | (2022.01) | |
| *G06V 30/10* | (2022.01) | |
| *G11B 27/10* | (2006.01) | |
| *H04N 21/81* | (2011.01) | |
| *H04N 21/845* | (2011.01) | |

(56) References Cited

U.S. PATENT DOCUMENTS

| | | | |
|---|---|---|---|
| 2011/0099195 A1 | 4/2011 | Patwardhan et al. | |
| 2014/0062696 A1* | 3/2014 | Packard | H04N 21/23418 |
| | | | 340/540 |
| 2014/0082655 A1* | 3/2014 | Moon | H04N 21/8586 |
| | | | 725/27 |
| 2016/0110877 A1* | 4/2016 | Schwartz | G06F 16/7867 |
| | | | 382/107 |
| 2016/0203843 A1 | 7/2016 | Beals et al. | |
| 2019/0068914 A1* | 2/2019 | Casner | G06V 20/42 |
| 2020/0294365 A1 | 9/2020 | Moskowitz et al. | |
| 2021/0141867 A1 | 5/2021 | Wason et al. | |
| 2021/0365707 A1* | 11/2021 | Mao | G06V 20/46 |

* cited by examiner

FIG. 4  400

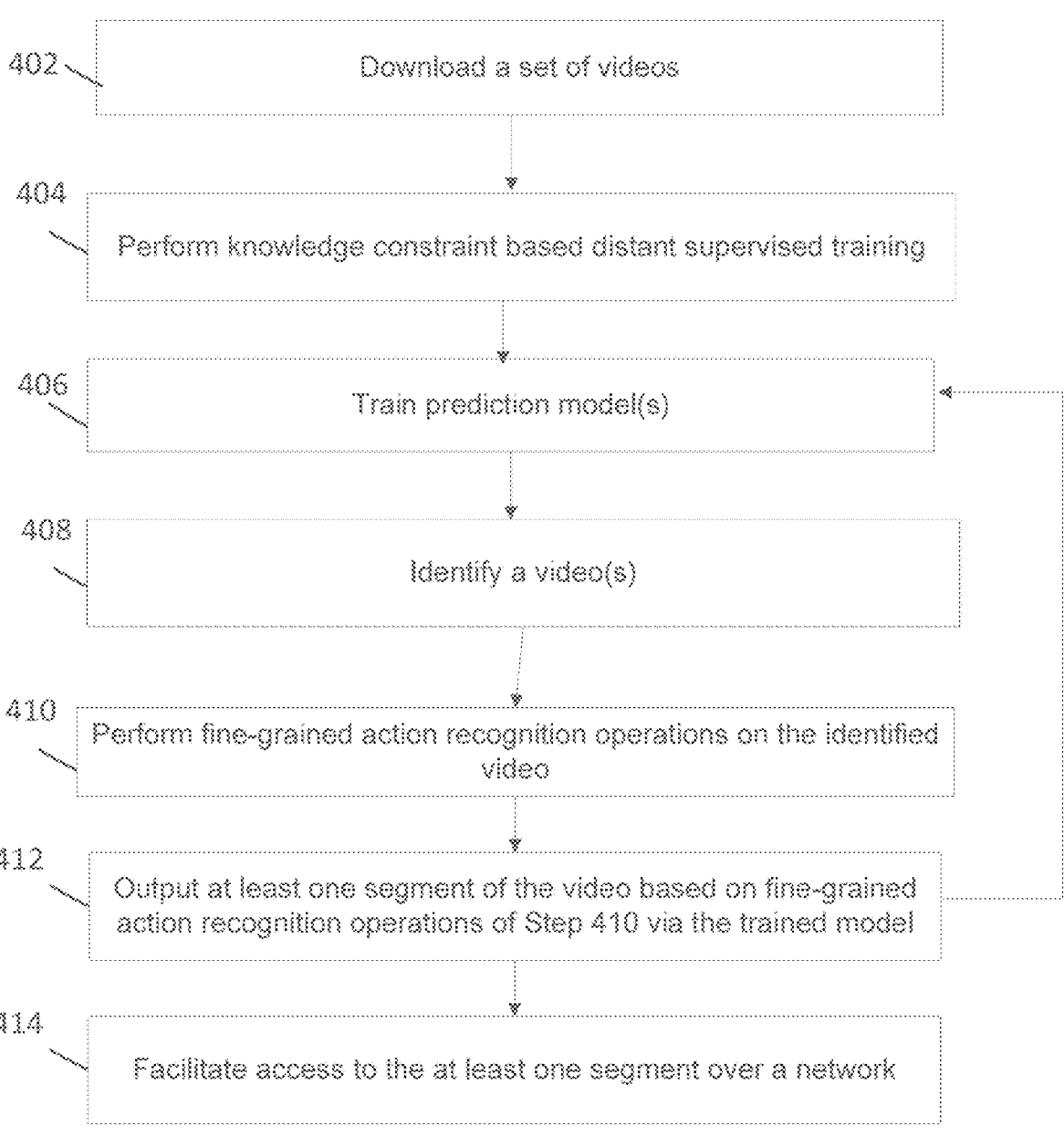

402 Download a set of videos

404 Perform knowledge constraint based distant supervised training

406 Train prediction model(s)

408 Identify a video(s)

410 Perform fine-grained action recognition operations on the identified video

412 Output at least one segment of the video based on fine-grained action recognition operations of Step 410 via the trained model 414 Facilitate access to the at least one segment over a network

404

502 — Determine surface form consistencies of objects in video frames

504 — Determine a presence of other contextual objects within each video frame

506 — Determine temporal consistencies across a videos' frames

Go to Step 406

FIG. 5B

FIG. 6A     410
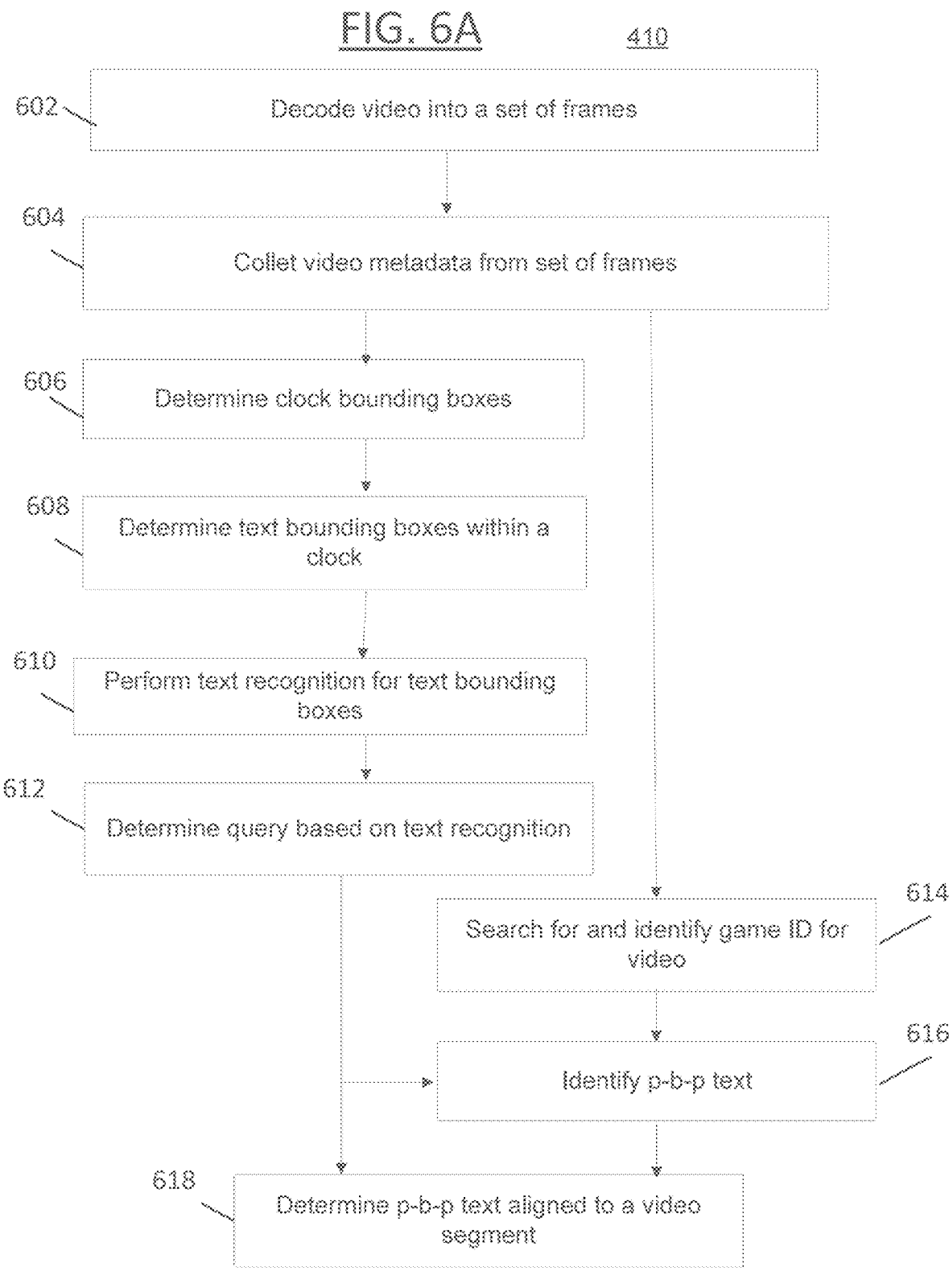
602 — Decode video into a set of frames
604 — Collet video metadata from set of frames
606 — Determine clock bounding boxes
608 — Determine text bounding boxes within a clock
610 — Perform text recognition for text bounding boxes
612 — Determine query based on text recognition
614 — Search for and identify game ID for video
616 — Identify p-b-p text
618 — Determine p-b-p text aligned to a video segment FIG. 6B                410
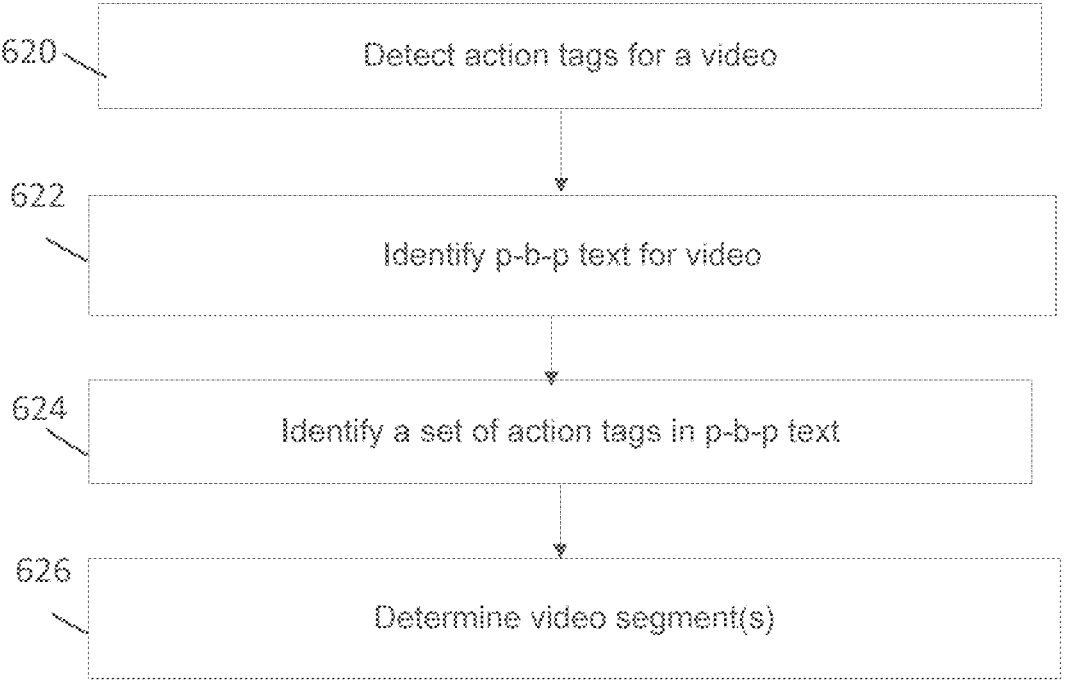
620 — Detect action tags for a video
622 — Identify p-b-p text for video
624 — Identify a set of action tags in p-b-p text
626 — Determine video segment(s)

<u>FIG. 7</u>          <u>700</u>
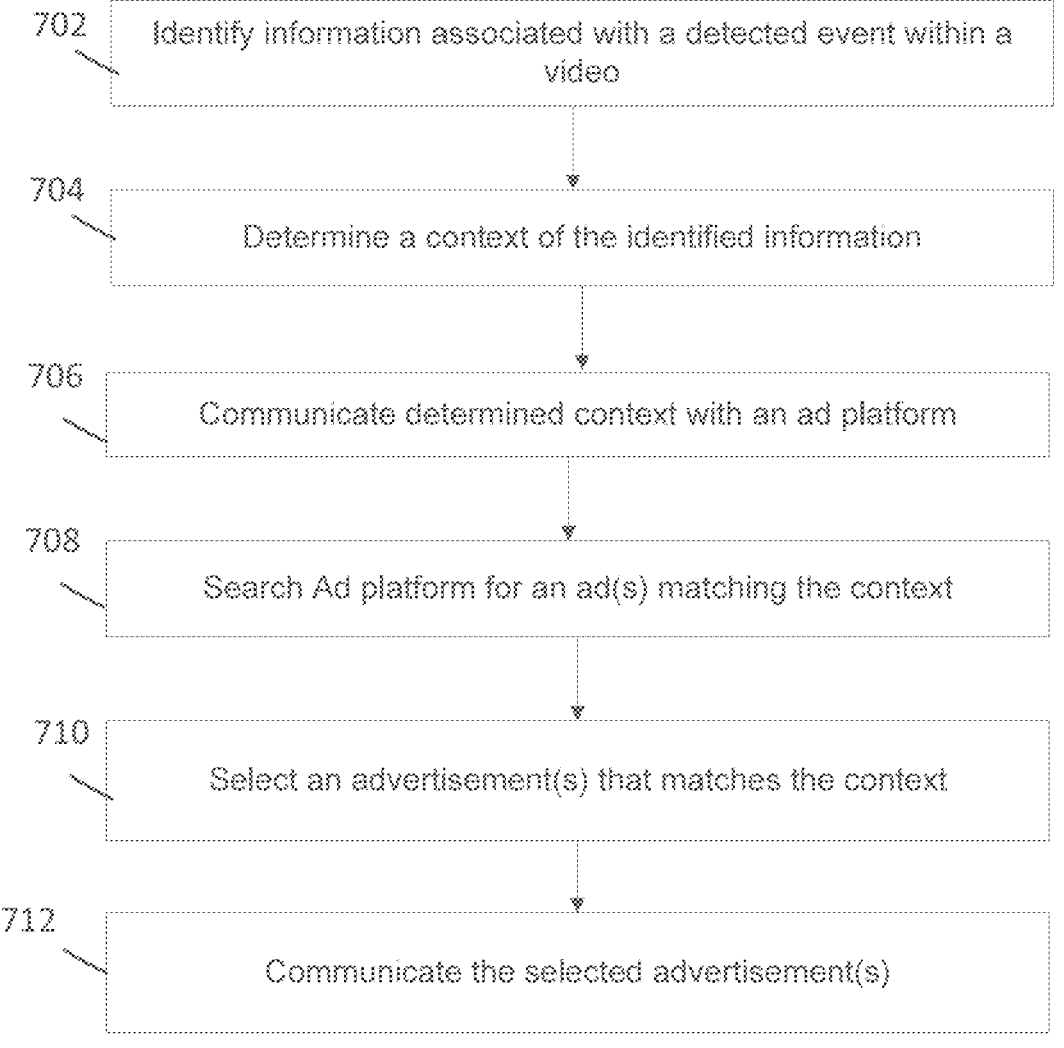
702    Identify information associated with a detected event within a video
704    Determine a context of the identified information
706    Communicate determined context with an ad platform
708    Search Ad platform for an ad(s) matching the context
710    Select an advertisement(s) that matches the context
712    Communicate the selected advertisement(s)

COMPUTERIZED SYSTEM AND METHOD FOR FINE-GRAINED EVENT DETECTION AND CONTENT HOSTING THEREFROM

CROSS REFERENCE TO RELATED APPLICATIONS

This application is a continuation of and claims the benefit of priority from U.S. patent application Ser. No. 17/211,055, filed Mar. 24, 2021, which is incorporated herein by reference in its entirety.

FIELD OF THE DISCLOSURE

The present disclosure relates generally to improving the performance of network-based computerized content hosting and providing devices, systems and/or platforms by modifying the capabilities and providing non-native functionality to such devices, systems and/or platforms through a novel and improved framework for developing and training high precision and high recall object/optical character recognition (OCR) models and applying them to media for fine-grained event (or action) detection and recognition.

BACKGROUND

Action recognition from content within videos depicting multiplayer sports has been a challenging task to be solved at a fine-grained level. Most conventional approaches utilize the pose, position, and movements of the players to detect the action being performed by the player. However, these approaches fall short of performing fine-grained action detection.

SUMMARY

This disclosure provides a novel framework that alleviates shortcomings in the art, and provides mechanisms for performing cost-effective, accurate and scalable detection and recognition of fine-grained events (or actions, used interchangeably).

According to the disclosed embodiments, the actions can be specific to a player (or actor or person or thing, used interchangeably), a league, type of event, team being represented (e.g., an affiliation), and the like, or combinations thereof.

For example, the disclosed framework can be deployed to detect "three-point shots" made (not attempted) by a player (e.g., Stephen Curry) when he is playing official NBA® games for his team (e.g., the Golden State Warriors). Thus, for example, videos of 2-pointers or 3-pointers made by Curry during exhibition games (e.g., the NBA® All-Star Game), practice videos or from Instagram clips would be filtered out or disregarded.

According to disclosed embodiments, as discussed below, the framework functions by training high precision and high recall OCR models and aligning video frames to text commentaries of the videos (e.g., licensed play-by-play). The disclosed framework operates as an algorithm that performs multimodal alignments between events/actions within videos and their prescribed text. Thus, rather than utilizing existing state of the art (SOTA) algorithms, as in conventional systems, which are unable to scale to fine-grained action categories across different venues (e.g., different sports), the disclosed framework provides a novel algorithm that is able to analyze the key frames and key aspects of a video to identify particular actions performed by particular actors, thereby providing the novelty of fine-grained action detection and recognition.

For purposes of this disclosure, licensed videos from entities (e.g., NBA®, NFL®, MLB®, NHL®, PGA®, and the like) will be used for exemplary purposes of disclosing the systems and methods of the novel framework; however, it should not be construed as limiting, as the disclosed framework can be applied to any type of media content, whether video or other forms of multi-media or images—for example, user generated content (UGC) on YouTube® or on social media sites, and the like.

As discussed in more detail below, the disclosed framework effectuates an increase in search relevance and discoverability of sports videos (e.g., an owned and operated (O&O) asset) by leveraging another O&O asset (e.g., play-by-play (p-b-p) rich commentaries) through a developed relationship defined by a one to one alignment between video frames and p-b-p text. Such multimodal alignments form the basis for various upstream computer vision tasks, such as, but not limited to, in-video search, video scrubbing, video thumbnail generation or selection, deep linking of players and events in videos, generating in-video descriptions, content-based recommendation graphs, and the like, or some combination thereof.

In accordance with one or more embodiments, the present disclosure provides computerized methods for a novel framework for developing and training high precision and high recall OCR models and applying them to media for fine-grained event (or action) detection and recognition. In accordance with one or more embodiments, the present disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, messaging server, email server, ad server, content server and/or client device, and the like) cause at least one processor to perform a method for a novel and improved framework for developing and training high precision and high recall OCR models and applying them to media for fine-grained event (or action) detection and recognition.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 is a block diagram illustrating an exemplary data flow in accordance with some embodiments of the present disclosure;

FIGS. 5A-5D detail non-limiting example embodiments of scale prediction operations according to some embodiments of the present disclosure;

FIGS. 6A-6C illustrate non-limiting example embodiments of a data flow for performing fine-grained action recognition on an identified video(s) according to some embodiments of the present disclosure; and FIG. 7 is a block diagram illustrating an exemplary data flow in accordance with some embodiments of the present disclosure.

DESCRIPTION OF EMBODIMENTS

Figure 1:
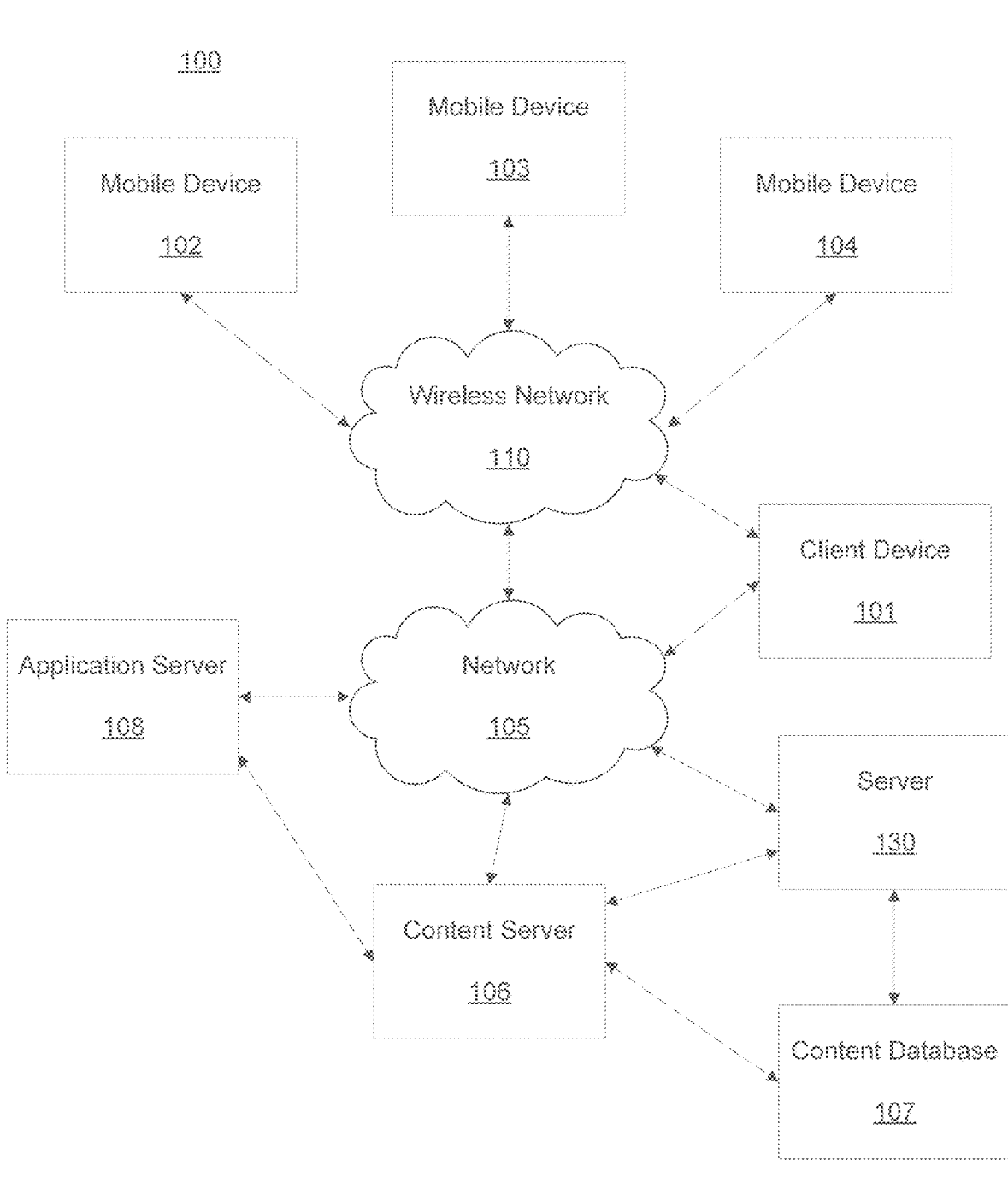
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/ or capabilities. Therefore, while some content is referred to as an advertisement, it is still a digital media item that is renderable by a computing device, and such digital media item comprises content relaying promotional content provided by a network associated party.

As discussed in more detail below at least in relation to FIG. 7, according to some embodiments, information associated with, derived from, or otherwise identified from, during or as a result of identification of an event(s) within an identified video, as discussed herein, can be used for monetization purposes and targeted advertising when providing, delivering or enabling such devices access to content or services over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108 and third party server 130.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like.

Third party server 130 can comprise a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is, advertisers will pay higher advertising rates when they believe their ads are being placed in or along with highly relevant content that is being presented to users. Reductions in the time needed to quantify a high quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as, but not limited to, news applications (e.g., Yahoo! Sports®, ESPN®, Huffington Post®, CNN®, and the like), mail applications (e.g., Yahoo! Mail®, Gmail®, and the like), instant messaging applications, blog, photo or social networking applications (e.g., Facebook®, Twitter®, Instagram®, and the like), search applications (e.g., Yahoo!® Search), and the like, can be hosted by the application server 108, or content server 106 and the like.

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108 and/or 130.

Moreover, although FIG. 1 illustrates servers 106, 108 and 130 as single computing devices, respectively, the disclosure is not so limited. For example, one or more functions of servers 106, 108 and/or 130 may be distributed across one or more distinct computing devices. Moreover, in one embodiment, servers 106, 108 and/or 130 may be integrated into a single computing device, without departing from the scope of the present disclosure.

Figure 2:
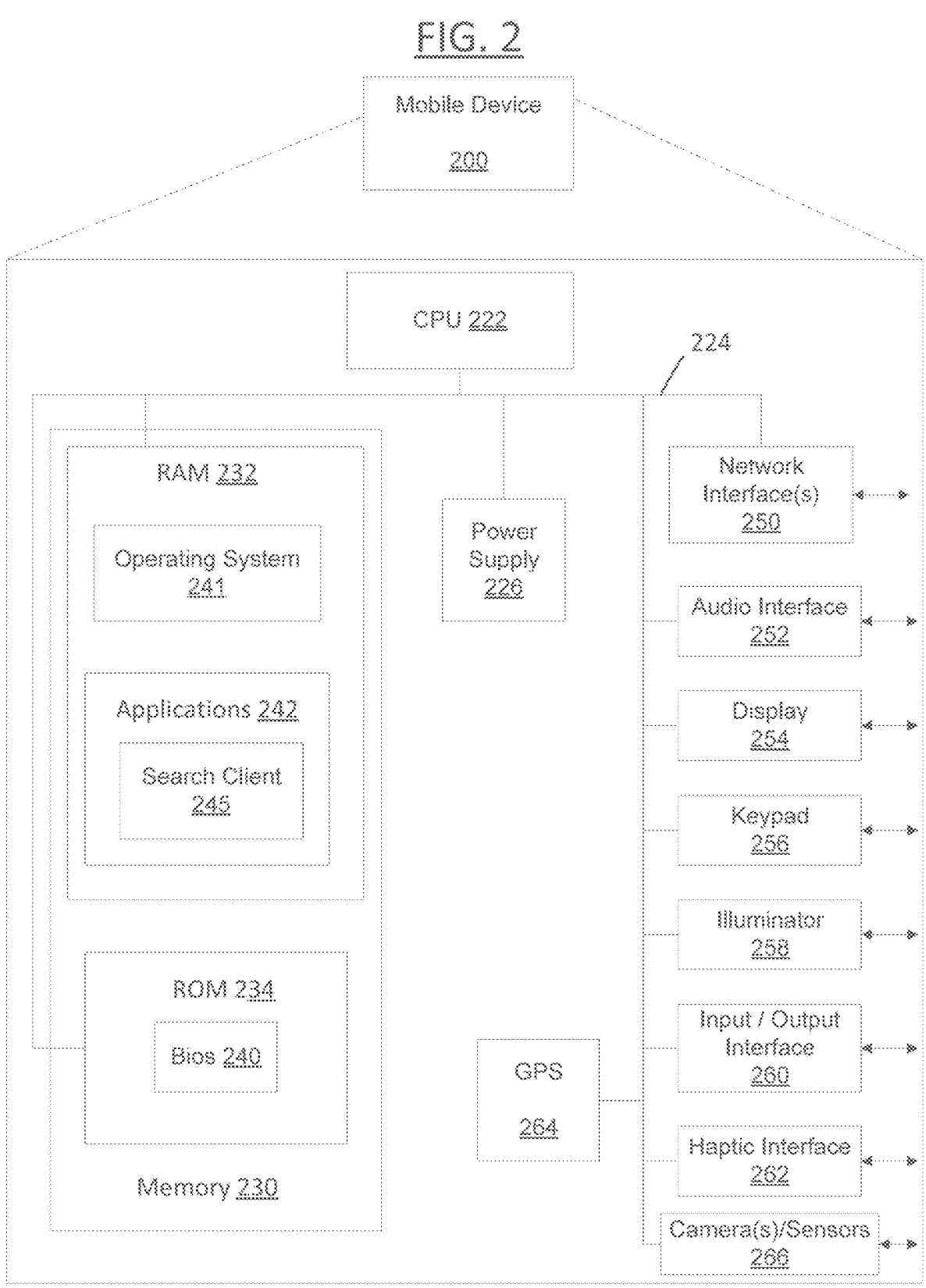
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geopositioning mechanisms, including, but not limited to, triangulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below.

Figure 3:
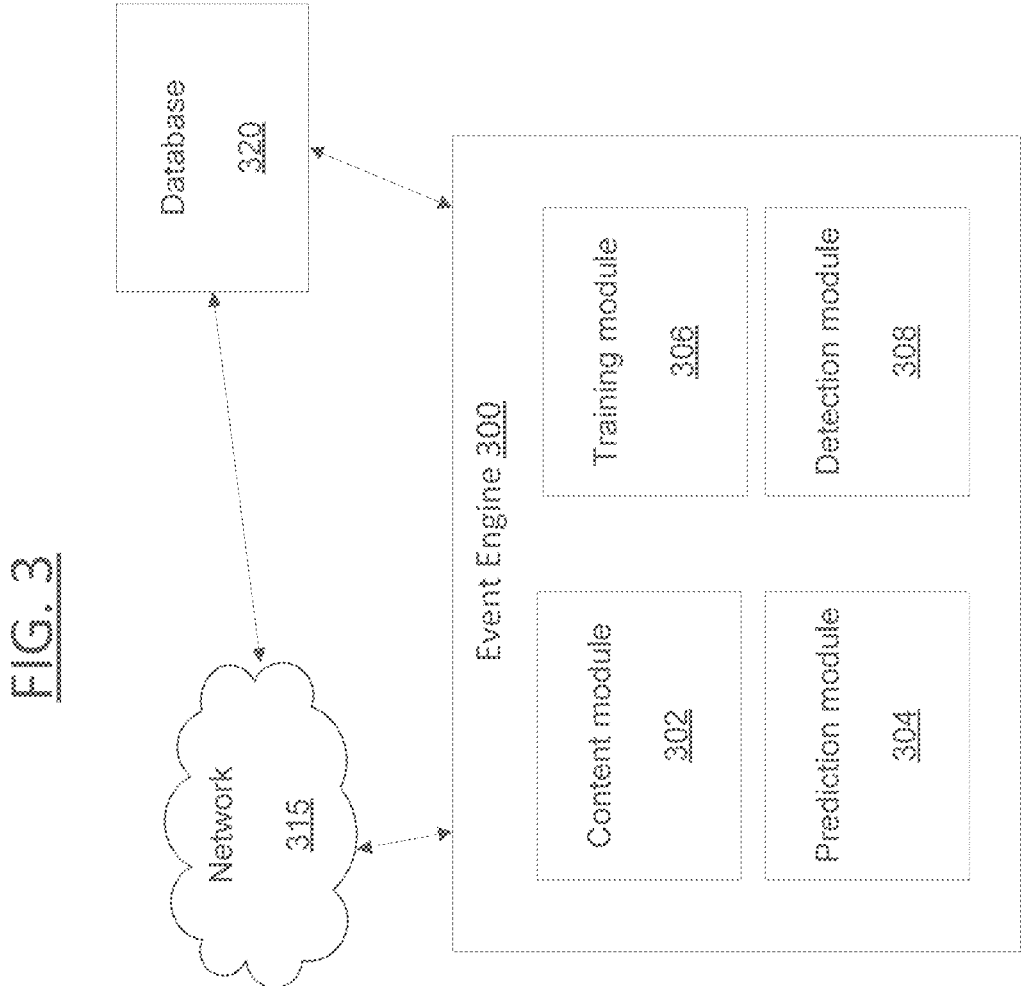
FIG. 3 is a block diagram illustrating components of an exemplary system in accordance with embodiments of the present disclosure.

FIG. 3 is a block diagram illustrating the components for performing the systems and methods discussed herein. FIG. 3 includes event engine 300, network 315 and database 320. The event engine 300 can be a special purpose machine or processor and could be hosted by a cloud server (e.g., cloud web services server(s)), messaging server, application server, content server, social networking server, web server, search server, content provider, third party server, user's computing device, and the like, or any combination thereof.

According to some embodiments, event engine 300 can be embodied as a stand-alone application that executes on a user device. In some embodiments, the event engine 300 can function as an application installed on the user's device, and in some embodiments, such application can be a web-based application accessed by the user device over a network. In some embodiments, the event engine 300 can be installed as an augmenting script, program or application (e.g., a plug-in or extension) to another application or portal data structure.

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content and the like.

In some embodiments, such information can be stored and indexed in the database 320 independently and/or as a linked or associated dataset. An example of this is look-up table (LUT) illustrated in FIG. 4, as discussed below. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user patterns, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with users, messages, images, videos, text, products, items and services from an assortment of media, applications and/or service providers and/or platforms, and the like. Accordingly, any other type of known or to be known attribute or feature associated with a message, data item, media item, login, logout, website, application, communication (e.g., a message) and/or its transmission over a network, a user and/or content included therein, or some combination thereof, can be saved as part of the data/metadata in datastore 320.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the event engine 300, and the database of stored resources 320. Indeed, as illustrated in FIG. 3, the event engine 300 and database 320 can be directly connected by any known or to be known method of connecting and/or enabling communication between such devices and resources.

The principal processor, server, or combination of devices that comprise hardware programmed in accordance with the special purpose functions herein is referred to for convenience as event engine 300, and includes content module 302, prediction module 304, training module 306 and detection module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning to FIG. 4, Process 400 details non-limiting embodiments for performing scalable detection and recognition of fine-grained events. As discussed herein, Process 400 functions by training high precision and high recall OCR models and aligning video frames to text commentaries of the videos (e.g., licensed p-b-p). The p-b-p text includes information related to a game, such as, but not limited to, which teams are playing, which players are playing, the game date, time, quarter/period, text commentary for every second that occurred in the game, and the like, or some combination thereof. The p-b-p text provides an official time-aligned captioning of commentary from/within segments of a video.

According to some embodiments, Steps 402, 408 and 414 of Process 400 are performed by content module 302 of event engine 300; Step 404 is performed by prediction module 304; Step 406 is performed by training module 306; and Steps 410-412 are performed by detection module 308.

Process 400 of FIG. 4 begins with Step 402 where a set of videos are identified and downloaded (e.g., training videos). These videos can be stored in a database (320) in association with engine 300, as discussed above in relation to FIG. 3.

In some embodiments, a single video can be downloaded where the subsequent steps of Process 400 can be applied thereto in a sequence with other videos; and in some embodiments, a plurality of videos can be downloaded as a batch operation, whereby the subsequently disclosed steps of Process 400 are performed in a batch.

For purposes of this disclosure, the processing of a downloaded video from Step 402 will be in regard to a single video solely for clarity of explanation purposes, as one of ordinary skill in the art would readily recognize the applicability of engine 300's performance of Process 400 (and its sub-steps) to a plurality of videos without departing from the scope of the instant disclosure.

As discussed above, the video downloaded in Step 402 is a licensed video clip from a third party provider—for example, for purposes of explanation only, a video clip hosted on You Tube® by the NBA® for a game played in the NBA® between the Milwaukee Bucks® and Washington Wizards®.

By way of background, almost all video content owners like NBA®, NFL®, NHL® and broadcasters like Bleacher Report®, Time Warner® and ESPN®, for example, have YouTube® channels that get readily updated with the highlight videos a few minutes after the game. YouTube has several resolutions of the videos—for purposes of this disclosure, however, YouTube's 720p resolution will be utilized. However, it should not be construed as limiting, as any value of resolution from a content hosting site, regardless of the site, can be leveraged for purposes of performing the disclosed systems and methods without departing from the scope of the instant disclosure.

For example, YouTube's 720p resolution mostly operates at 25 frames per second (fps). YouTube highlight videos are longer in duration, averaging 9-15 mins, and are crawled by parsing the JavaScript in the HTML page, which has dynamic URLs for each video resolution. Downloaded YouTube videos tend to not have any audio in the audio channel. However, they are double the time length of the original video. The visual channel remains intact, thus allowing engine 300 to analyze the video.

It should be understood that the disclosed systems and methods should not be construed to solely operate on or in accordance with videos' frame rates, as mentioned herein, as any frame rate, whether currently utilized or to be utilized in the future, can be leveraged according to the disclosed systems and methods without departing from the currently disclosed scope and functionality.

As discussed below in detail, and illustrated in FIGS. 5C-5D, linking time-specific game events from a video's content to p-b-p data corresponding to points in time of the video, enables engine 300 to identify specific segments, and for example, create a playlist of types of events (e.g., a playlist of video clips of Stephen Curry made 3-pointers).

According to some embodiments, Step 402 involves a network bound operation being performed by engine 300 where a video(s) is downloaded from static mp4 uniform resource locators (URLs) identified from facets (e.g., metadata, attributes or deep linked data) of the video's content. For example, Step 402 can involve identifying a video on a network site (e.g., a video identifier (ID) on YouTube®), then parsing the video's Hypertext Markup Language (HTML) page to obtain at least one generated CDN URL of a full video associated with the video ID. In some embodiments the YouTube page and CDN URLs can be crawled periodically to discover new content, as well as determine video IDs, descriptions, titles, video length and publish data.

As discussed above, the videos being analyzed here are official videos for licensed content, and are referred to as O&O videos, as discussed above.

Figure 5A:
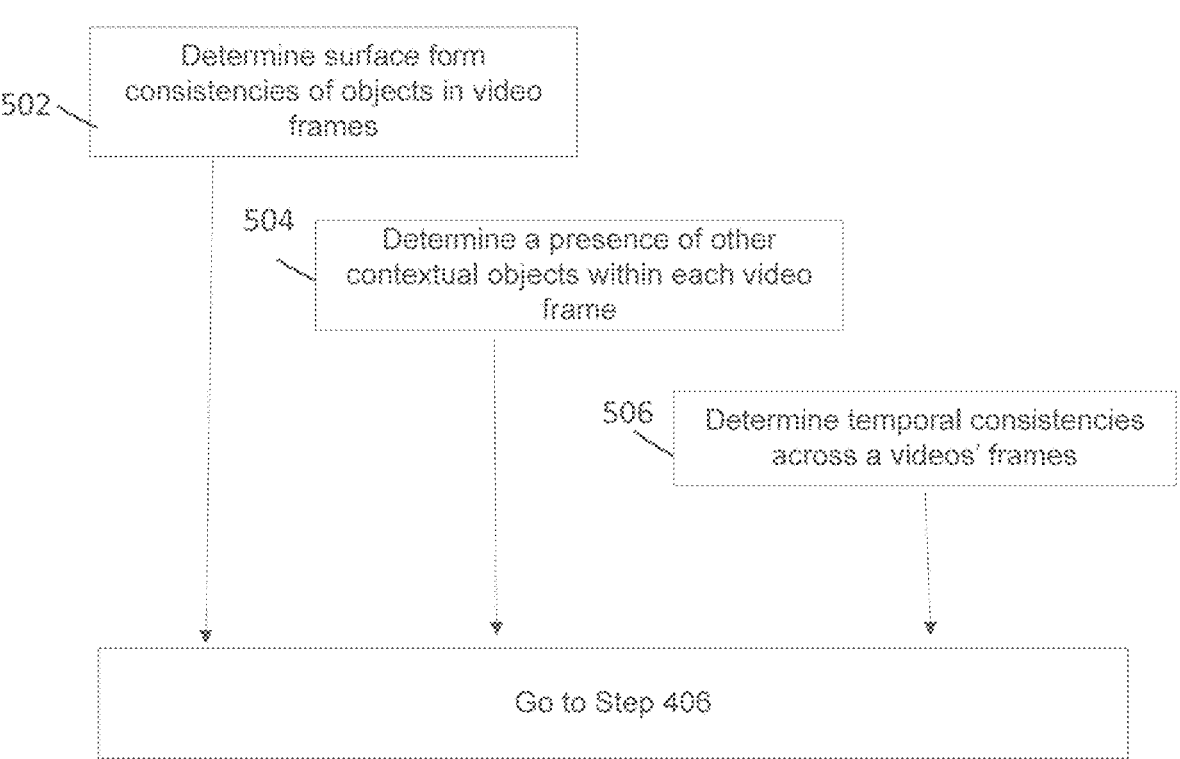

In Step 404, engine 300 performs knowledge constraint based distant supervised training of high precision and high recall OCR models on the identified and downloaded video(s) (e.g., on the training videos). The operations of Step 404 are discussed in detail in FIG. 5A, which provides blocks 502-506. As illustrated in FIG. 5A, and discussed in detail below, Step 404 can involve the performance of block 502, 504 and/or 506, as a portion or all of the determinations from blocks 502-506 can be performed as part of Step 404.

The disclosed processing of Step 404 involves scalable training by using knowledge constraints. According to some embodiments, the prediction, text recognition and query determinations of Steps 506-512, inter alia, are performed based on and utilizing models trained from distantly supervised training data obtained through the following knowledge constraints (as discussed herein in Step 404, its substeps, and Step 406 below).

Turning to FIG. 5A, the blocks of Step 404's knowledge constraint based distant supervised training on the downloaded video(s) from Step 402 are detailed. The blocks, which can be viewed as sub-steps, of FIG. 5A are performed for each video identified and/or downloaded in Step 402. As mentioned above, a portion or all of the block/sub-steps can be performed.

Knowledge constraints are used to regularize model posteriors and have been studied in natural language process (NLP) and in computer vision technologies. Specifically, those methods revolve around using first-order logic rules as soft constraints to regularize beyond the usage of labeled training examples. The premise of knowledge constrained training regimes has been about reducing the need for task-specific labeled examples.

With the advent of large pre-trained models, both for computer vision and NLP tasks, the disclosed framework leverages this by combining prediction results of one or many of such pre-trained models, and binding them in first-order logic, ensuring the accuracy of a target task, as discussed herein.

Figure 5B:
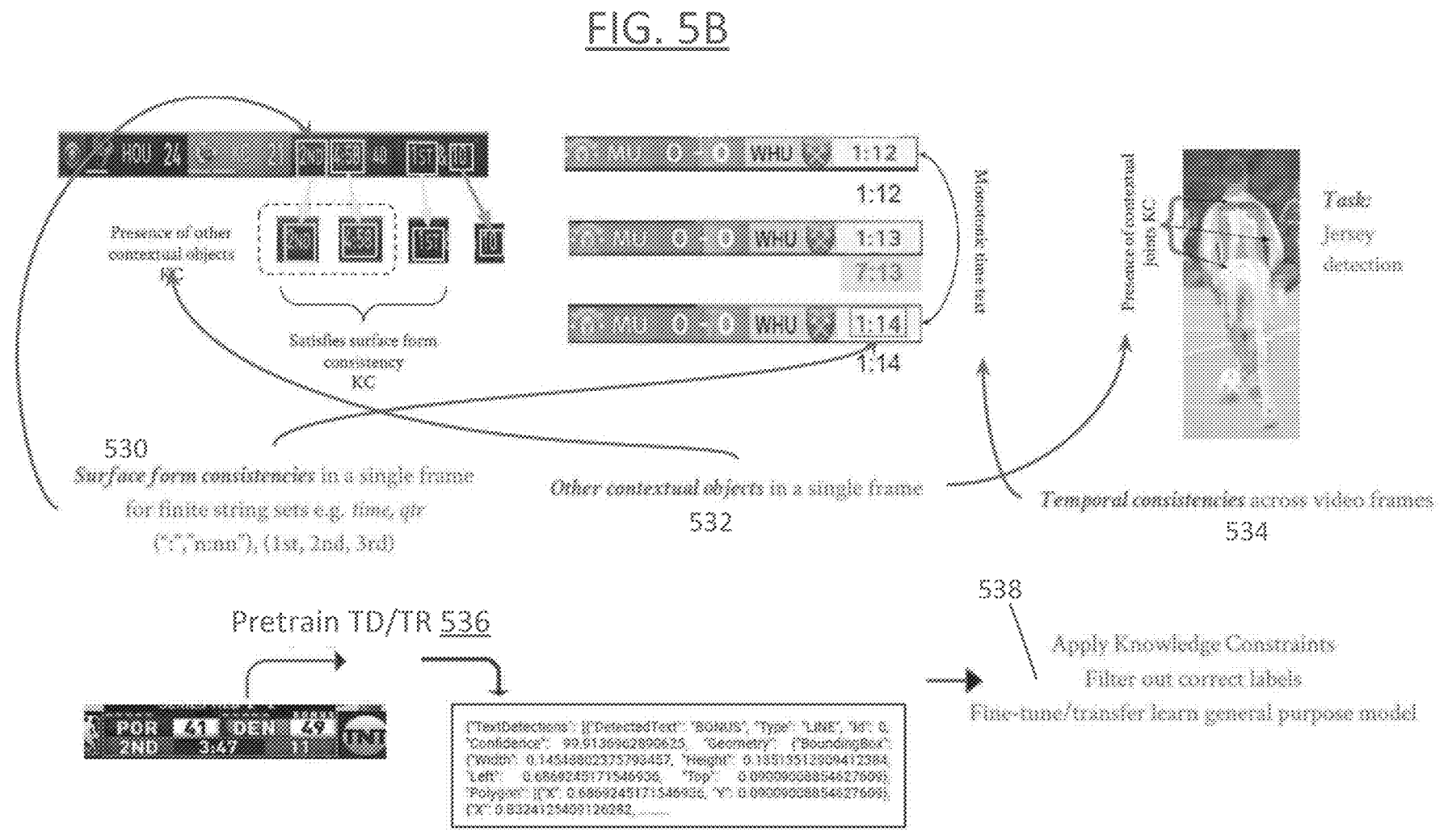
Figure 5C:
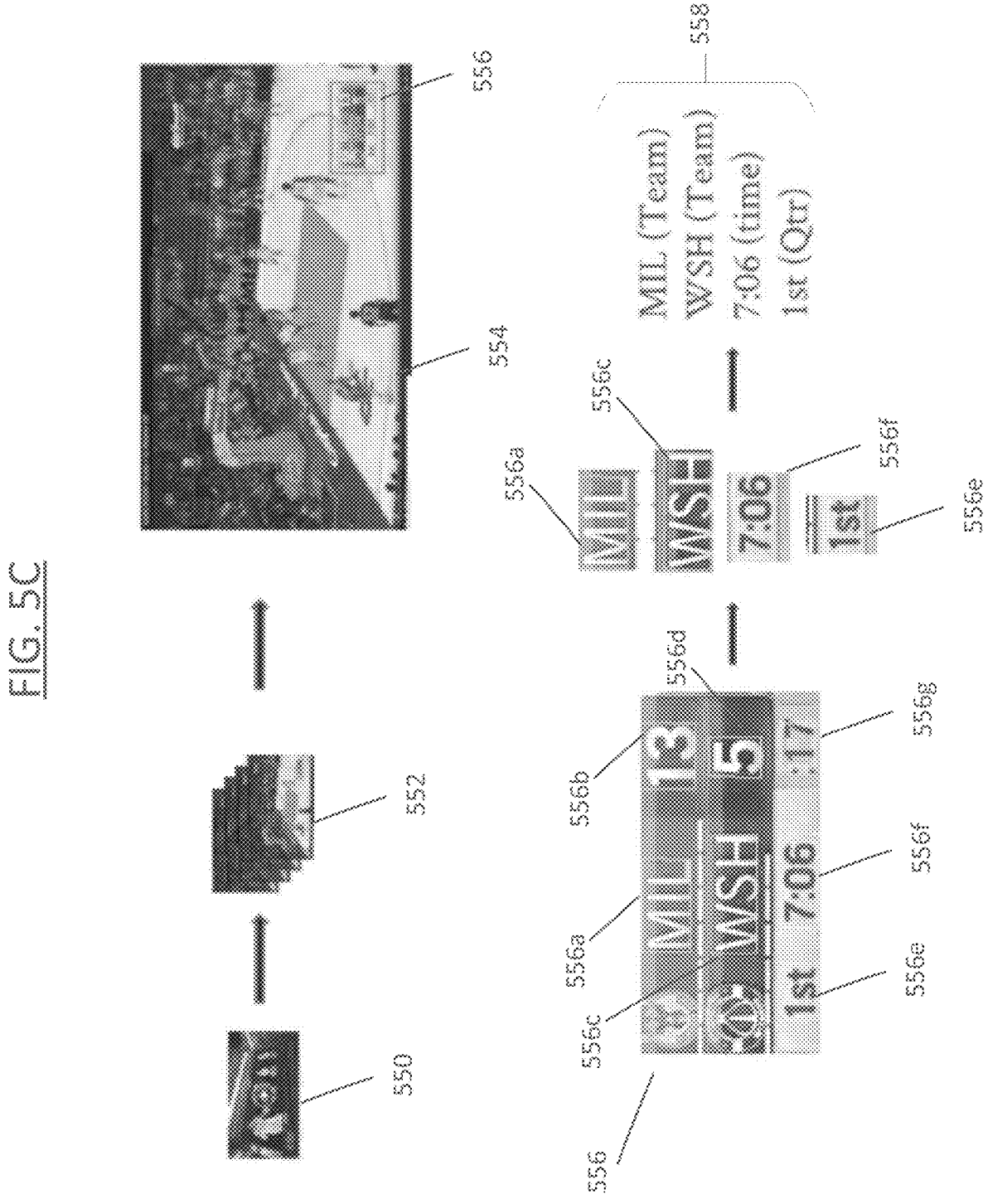

According to some embodiments, as discussed herein, engine 300 utilizes the unlabeled cropped clock object (as depicted in FIG. 5C) as an input image to pre-trained text detector and recognizer, and collects predicted text bounding boxes and corresponding recognized text strings as output. Predictions from such general-purpose models tend to be inexact, leading to the wrong image to text-domain transfers. Thus, they are combined with the knowledge constraints to both select high-quality training data and filter out predictions post-training to achieve high precision.

In some embodiments, as discussed herein with reference to blocks 502-506, the knowledge constraints can be leveraged to produce high-quality training data that can be utilized for transfer learning (as discussed below in relation to Step 406. Knowledge constraints (KC) can be broadly classified into the following determinations: (i) surface form consistencies of objects in a single video frame (block 502, and item 530 of FIG. 5B); (ii) presence of other contextual objects in a single video frame (block 504, and item 532 of FIG. 5B); and (iii) temporal consistencies across video frames (block 506, and item 534 of FIG. 5B). As discussed herein, the knowledge constraints (i, ii and/or iii) are utilized to construct an in-domain (e.g., separate for NBA, NFL, NHL, Soccer, and the like), accurate, large training dataset without human intervention, which is used to transfer learn pre-trained models for accurate determination of and application of in-domain models.

In block 502, (i) surface form consistencies of objects in a single video frame of a video are determined. According to some embodiments, time text on the clocks can be easily recognized by their surface forms: n{1+}:n{1+} or n{1+}: n{1+}.n{1+}, and the like. In case of leagues (or entities) like NFL®, NBA® and NHL®, time representing quarters have limited string combinations—"1st", "2nd", "3rd" or "4th", while in Soccer, times in both play-by-play and the game clocks are continuous time. Thus, in some embodiments, block 502 involves engine 300 checking for such surface form consistencies among recognized strings while preserving the text bounding boxes and those recognized texts enables engine 300 to output high-quality training data.

Turning to FIG. 5B, item 530 illustrates a non-limiting example embodiment of surface form constraints in a single frame for a finite string set (e.g., time, quarter, (":", "n:nn"), ($1^{st}$, $2^{nd}$, $3^{rd}$), and the like.

Turning back to FIG. 5A, in block 504, in some embodiments, a determination is made with regard to (ii) a presence of other contextual objects in a single video frame of a video. According to some embodiments, some leagues or sports require providers (e.g., Verizon®) to disambiguate further text recognition beyond surface form checks. For example, in the NFL, there could be a $1^{st}$ down play during the $2^{nd}$ quarter (as illustrated in FIG. 5B, item 532). Thus, in some embodiments, block 504 involves engine 300 utilizing the detection of a time surface form and the nearest qualifying quarter text as the right pick. That is, a determination is made as to which context and what positioning are the time characters within the clock box.

In some embodiments of block 504, in a similar regard to recognizing jersey numbers on players' uniforms/jerseys, the mechanism of filtering out quality training labels by selecting a bounding box spatially surrounded by a recognized body part (e.g., head, arms, hips) can be implemented using a multi-person human pose detection model. An example of this is illustrated in FIG. 5B, item 532. These bounding boxes can then be passed to a pretrained general-purpose text detector and recognizer. This constraint technique can further be extended to filter out text from graphic ads on a playing field (e.g., basketball court or baseball field's fencing).

In some embodiments of block 504, alternatively, the jersey bounding box can also be checked to have a high intersection with people segmentation masks obtainable from pre-trained general-purpose semantic segmentation models (as illustrated in FIG. 5B, item 532).

In block 506, in some embodiments, a determination is made with regard to (iii) temporal consistencies across video frames of a video. In some embodiments, text recognition mistakes done by a general-purpose model (to be used as training data) can also be validated by the continuity of corresponding text in the next frame. In some embodiments, time text can be converted to its corresponding value in seconds or minutes, whereby a comparison can be performed to determine if they are monotonically increasing (in case of soccer, for example) or decreasing (in the NFL, NBA and NHL, for example). The time text detected from intermediate frames not following the monotonicity can be discarded; hence, not making it to the filtered set of high-quality training examples.

An example of temporal consistencies from block 506 is illustrated in FIG. 5B, item 534.

In some embodiments of block 506, in addition to these temporal consistency checks applied to filter out training data, engine 300 can also check whether recognized time and quarter across different frames within 1 second of the video, guided by the video's frame rate, match. In some embodiments, given the video's frame rate, a check can be performed at least k frames before and after any current frame (for which a text recognition correctness can be determined), where it can be recognized whether the same time and/or quarter (or period) are detected. These kinds of checks enable engine 300 to identify and filter out wrong recognitions in transition frames, in which perhaps the clock is vanishing and/or is blurring out.

Thus, the blocks 502, 504 and/or 506 of Step 404, as outlined with reference to FIGS. 5A-5B, result in the determination of knowledge constraints that are utilized/leveraged to train models, as discussed below in relation to Step 406. That is, as discussed below and illustrated in FIG. 5B, in some embodiments, the knowledge constraints can be applied to recognized text from training videos utilizing pretrained models (e.g., text detection (TD) and text recognition (TR) models)—item 538 in FIG. 5B, such that the models are trained. The TD/TR models (item 536 in FIG. 5B) are utilized, upon training, to perform clock bounding box prediction, and text recognition therein, as discussed in more detail below.

An example of a TD model is EAST, which is pretrained on ICDAR 2015 street background data, outdoor images with texts, and the like. An example of a TR model is CRNN, which is pretrained on Synth90k Synthetic word strings, text images, and the like. An example of a general purpose TD/TR model is Amazon Cloud APIs (e.g., Rekognition).

Turning back to FIG. 4, upon completion of Step 404 (and its sub-steps discussed above in relation to FIG. 5A), Process 400 proceeds to Step 406, where the prediction models used to determine clock data are trained. The training is based on the distantly supervised, knowledge constraint-based model training from Step 404 and its sub-steps.

In Step 406, engine 300 utilizes the knowledge constraints determined in Step 404 to train transfer models (e.g., CRNN and/or EAST) to detect and recognize information within the video frames (e.g., detect and recognize clocks and the information included in the clocks through an object detection model-based detection from a video frame). Training data for text detection and recognition models can be bootstrapped by utilizing pretrained models (or Amazon Cloud APIs (e.g., Rekognition)). Noisy bounding box predictions (for clocks and/or the clock text included therein—for example, item 536 from FIG. 5B for pretraining TD/TR) from such pre-trained models are corrected by the knowledge constraints (e.g., i, ii and/or iii above, and illustrated in FIG. 5B, item 538), and can be stored and used as corrected labels for transfer learning text detection models (EAST) and text recognition models (CRNN), which results in the proprietary OCR model discussed herein. Such labels can be custom for a domain (e.g., NBA® vs. NFL®).

As a result of Steps 402-406, engine 300's implemented (detection and recognition) model(s) is trained. As a result, the trained model is deployed to crawl, mine and/or monitor for video content on a network to identify "watch worthy" content or video segments. Such segments correspond to content that is probable to be consumed by a plurality of users based on popularity, shareability or other metrics that indicates a threshold level of interest by the general public.

For example, Stephen Curry is a MVP-caliber playing in the NBA, and his jersey is currently the #4 top selling jersey in the NBA. These factors are compiled and lead to an output that highlights of Curry playing professional basketball are of interest to even the most passive NBA fan.

Thus, Process 400 proceeds to Step 408 where a video is identified. The video can be the result of a query by a user, an automatic detection of a recently uploaded video to a website (e.g., YouTube® by the NBA® for a recently played and completed game), or as a recommendation generated automatically based on a profile of a user (e.g., a user is known to be a Stephen Curry fan based on browsing history, a history of attending games, and/or a recent jersey purchase, for example).

In some embodiments, Step 408 can involve engine 300 leveraging an API crawler to crawl a media index (e.g., video.nba.com) a predetermined time period (e.g., every 30 minutes) to identify the latest (or most recent) video IDs. A set of videos are then identified, where the set can be all the latest uploaded videos, or a threshold satisfying number. In a similar manner discussed above in relation to Step 402, only one video will be discussed herein for explanation purposes; however, it should not be construed as limiting, as any number of videos can be identified and analyzed via the steps (and sub-steps) of Process 400 without departing from the scope of the instant disclosure.

In Step 410, engine 300 performs fine-grained action recognition operations on the identified video. Embodiments of operations of Step 410 are discussed in detail in FIGS. 6A-6C, which provide sub-steps 602-618 and 620-626, respectively.

Turning to FIG. 6A, in some embodiments, the sub-steps of Step 410 are disclosed as an embodiment for performing fine-grained action recognition. FIG. 6A begins with Step 602 where the video is decoded in to a set of frames. This is depicted in FIG. 5C, where a video (item 550) is decoded into a set of frames (item 552).

According to some embodiments, Step 602 involves applying a multimedia stream analyzer (e.g., ffprobe utility) to probe the video to identify its resolution (e.g., typically, 1080p for O&O videos and 720p for YouTube videos, by way of a non-limiting example) and its frame rate (e.g., typically 30 fps for O&O videos and 25 fps for YouTube videos, by way of a non-limiting example). A transcoding, video scaling program (e.g., ffmpeg) is then used to decode the video into a NumPy array of n channel images sequences (e.g., 3) at m of the input frame rate (e.g., ⅓).

In some embodiments, a video can be decoded into a different resolution—for example: 512×512 (a by-product of the ⅓ input frame rate decode), which is used in predicting bounding boxes of clocks using Single Shot Detector (SSD), as discussed below. The video's original resolution can then be used to crop out clocks by scaling the SSD box coordinates to the original frame width and height, as discussed below.

In Step 604, based on the decoding, the set of frames are analyzed and metadata for the decoded set of frames are identified. In some embodiments, not all the frames are analyzed, as the set of frames can include, but is not limited to, every nth frame for a n*x fps video. As discussed above, such metadata can include, but is not limited to, information indicating identity of a player (e.g., actor or person) depicted in the video, title of the video, description of the video, title, publish date, action performed in the video by the player, clock data and/or position, length of video, resolution, source, hosting platform, and the like, or some combination thereof.

In some embodiments, the metadata can be obtained using an application program interface (API) of a source of the video—for example, YouTube's data API that crawls the site and/or pages and obtains the metadata.

In some embodiments, the metadata can be obtained by analyzing the video and/or its decoded frames by any known or to be known media analysis technique, algorithm, classifier or mechanism, including, but not limited to, computer vision, Bayesian network analysis, Hidden Markov Models, artificial neural network analysis, logical model and/or tree analysis, data mining, and the like.

In Step 606, for the decoded set of frames, clock bounding boxes are determined based on their analysis. As discussed herein, the content (e.g., text and/or symbols), and in some embodiments, the location (e.g., spatial position within a frame), of the clock is determined.

According to some embodiments, the scaling of mp4 to the video frames decoding, as discussed above, can involve performing two separate decodes of the mp4 to video frames at ⅓ the input frame rate. The first decode resizes the frames to 512×512, by directly decoding a reduced resolution during a ffmpeg decode operation, which are used to generate/obtain clock bounding box predictions (Step 606). Post predictions (as discussed below), the 512×512 stack of frames can be flushed from memory.

Step 606, therefore, involves performing batch predictions for clock bounding box detection by passing a batch of a video's frames (e.g., an entire set of frames for a 15 minute video) to an SSD model that identifies bounding boxes of a clock, as discussed above.

In some embodiments, as discussed above, the SSD execution on the decoded frame sets (e.g., 512×512 and the original resolution frames) results in predicting a spatial region of clocks, which can be resized to identify the coordinates of the clocks in a full- (or natural-) sized frame. As discussed herein, this enables the cropping out of clocks of natural sizes, as seen in full-sized frames (e.g., original resolution frames), from the decoded frames (e.g., 512× 512), and only preserve these clock crops, while discarding the stack of full frames.

For example, as illustrated in FIG. 5C, frames 552 are analyzed via the SSD, and the bounding box location and identity are identified. For example, for exemplary frame 554, the clock 556 is identified.

As discussed below in relation to Steps 608-610, the clock is then further analyzed to identify bounding boxes for the text/data included therein, which as depicted in FIG. 5C, includes, but is not limited to, text for team names/abbreviations: "MIL" 556a, "WSH" 556c; the current time of the frame 556: "7:06" 556f; the current quarter: "1$^{st}$" 556e; and the teams' respective scores at time 556f: "13" 556b, and "5" 556d. In some embodiments, there may be additional information to be recognized, which may be specific to the sport being played. For example, here, since this is an NBA game, there is a time for the "Shot Clock", as depicted by the "17" 556g. As discussed below, this information is batched dynamically, analyzed and used to output a data set 558 that is used to query for p-b-p data.

In Step 608, the text bounding boxes within the clocks' bounding box (from Step 606) are then determined. According to some embodiments, engine 300 performs a clustering operation by identifying similar sized clocks (based on the metadata), which can result in a group of clocks from temporally non-contiguous frames.

In some embodiments, engine 300 can implement a cluster algorithm, for example, DBScan graph clustering to cluster the predicted bounding boxes (from Step 606) based on their sizes and spatial positions, using an intersection over union (IOU) metric as the distance metric between clocks of different frames.

In some embodiments, such clustering/groupings may still result in large batch sizes, leading to out of memory (OOM) error in a graphics processing unit (GPU) of the device executing engine 300. Thus, in some embodiments, a max batch size can be benchmarked for different clock sizes for each GPU type (P100-16B/V100-16GB/V100-32GB). Thus, while performing the bounding box determination/prediction of Step 608, engine 300 can further slice groups based on admitted batch sizes for a particular clock size. In some embodiments, certain text areas may be cropped out—for example, as illustrated in item 556g, the semi-colon for the "Shot-clock" can be disregarded since it is known that the clock's maximum time is 24 seconds (i.e., ":24") and the semi-colon is simply an indicator of seconds.

In some embodiments, as discussed above, the clock data can be removed from memory as the processing moves to Step 610 from Step 608. Such clock data can include, but is not limited to, the bounding box of the clock, a portion or all of the bounding box text data, and/or the cropped out data, and the like, or some combination thereof.

In Step 610, engine 300 then performs text recognition for the text bounding boxes. As discussed above in relation to FIG. 5C, the text within the bounding boxes of clock 556 are processed to determine characters, strings and the like depicted within each bounding box.

In some embodiments, the bounding boxes determined in Step 608 are batched and input into a neural network model for analysis. For example, the bounding box data from Step 608 is compiled as a batch input for a convolutional recurrent neural network (CRNN) model. The result of such analysis, for example, is the determination of the teams, time and quarter, as illustrated in FIG. 5C, item 558.

In some embodiments, the CRNN can be coupled to another neural network model, such as, for example, EAST. Usage of object detection model (SSD) in connection with "inside clock text detection" allows the text detection model to avoid other background (e.g., on court or field) text, which is unrelated to "aligning" play-by-play to the video segment. For example CRNN can be used for text recognition and EAST for text detection, such that text areas in clock images (e.g., bounding boxes within a clock are determined by EAST) are identified, and CRNN is then applied (to perform text recognition).

In some embodiments, the output of the neural network(s) (e.g., CRNN, or CRNN and EAST) can then be used as input to a machine learning algorithm backed by a library for numerical computation and large scale machine learning, such as, but not limited to, TensorFlow. TensorFlow bundles machine learning and deep learning (e.g., neural network) models and algorithms; therefore, in some embodiments, the CRNN and EAST models can be used as a common metaphor Turning back to Step 604, upon collecting the metadata, and in some embodiments performed in parallel with Steps 606-610, engine 300 can use the collected metadata to determine a game ID for the video. Step 614. The game ID can then be used to search a schedule (e.g., the NBA® schedule or NBA website) to determine the identity of the game so that the p-b-p text for the game can be identified and retrieved. Step 616.

Figure 5D:
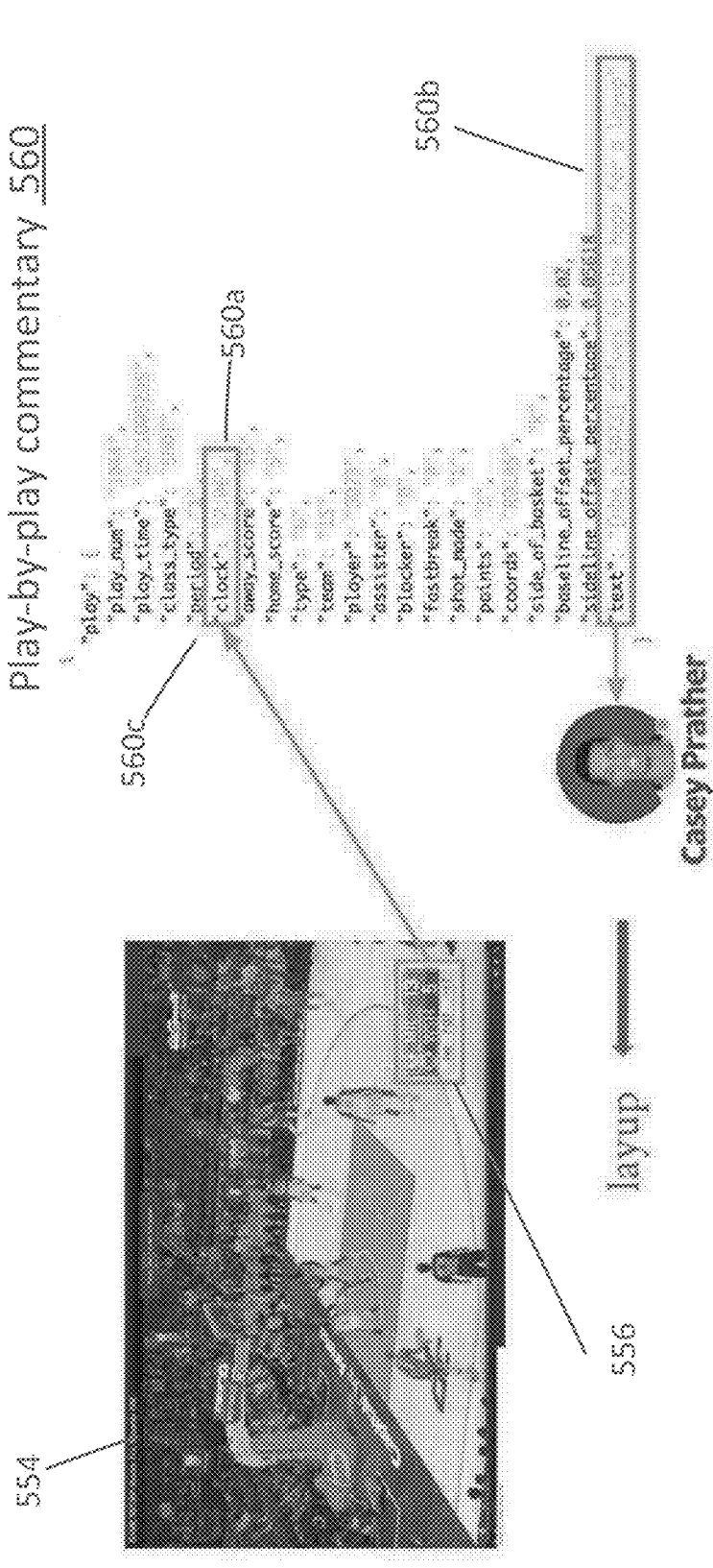

For example, as illustrated in FIG. 5D, for the clock bounding box 556, and its included data, the p-b-p text 560 can be identified. As discussed above, this text 560 can be retrieved from the rights holder of the video (e.g., NBA®, for this example). The text 560 includes, but is not limited to, information indicating the clock time 560a during quarter (or period) 560c (which corresponds to the time 556f during quarter 556e from FIG. 5C), and the action being captured/depicted in the frame 556 at time 560a during quarter 560c: item 560b—"[nba, p.5073] drives to the hoop for a layup", which indicates that player: nba, p5073 (e.g., Casey Prather) performed a layup attempt. Thus, the time and quarter (560a and 560c, respectively) act as a composite key, which as discussed herein, can be used to map the video segment (e.g., the frame(s)) to corresponding p-b-p text based on text recognition from the video. This, as discussed herein, enables corresponding commentary for every video segment to be identified and mapped accordingly.

Thus, based on the determined text recognition data (from Steps 610-612) and its corresponding p-b-p text (from Step 616), a determination is made regarding p-b-p text aligned (or matching) to a video segment(s). Step 618. In some embodiments, apart from action type, these mapped text records for a video segment provide other metadata including, but not limited to, player name, team name, shot distance, shot position, and the like. In some embodiments, the metadata is dependent on a sports type—for example, the metadata can include information indicating how long a run was, how long a pass was, and the like, for example.

Turning to FIG. 6B, sub-steps 620-626 are performed as an embodiment for performing scaled prediction of OCR based action recognition. FIG. 6B provides functionality for creating deep action tags for videos (NBA® videos, for example) so that deep indexing of the videos can be performed. This enables the searching for, browsing and identification of relevant videos, thereby increasing user experience and leading to user retention on a service providers network resources.

FIG. 6B begins with Step 620 where action tags for the identified video (from Step 408) are detected. The video can be for a game. In some embodiments, the game can be the whole game or a portion of a game. In some embodiments, the action tags can be detected from text associated with the video. In a similar manner as discussed above in relation to Step 402, the URLs from the HTML page source of the video are identified. These URLs are subject to processing in that the final section of the URL is identified and stripped out (or extracted), as it indicates the topic of the HTML. For example, a URL is: https://www.nba.com/video/2021/02/19/00020220/det-dal-play2. Thus, the "2021/00020220/det-dal-play2" would be stripped out; and it indicates, inter alia, that Detroit Pistons® played the Dallas Mavericks(s) on Feb. 19, 2021. It also can indicate a game ID: for example: "00020220".

After stripping out the topic portion of the URL, it is compared against a library. The comparison results in the detection of action tags for the video as URL portions are mapped to defined actions in the library. In some embodiments, the library can include, but is not limited to, a game schedule, player names, action names and/or types, and the like. For example, a library can be hosted by the source provider: NBA.com, or can be another site, for example, Wikipedia®.

The URLs can include textual patterns, which can be stripped out. A sample of example textual patterns is provided below, with reference to a video type and its URL/pattern, is provided below in Table 1:

TABLE 1

(illustrating video types and URL and patterns).

| Video Tye | {URL last segment/Title/Description}, Textural Patterns |
|---|---|
| Player Moves | 0021800369-ben-simmons-detroit-pistons-philadelphia-76ers-buzzer-beater-2q A bigtime dunk by Ben Simmons in the second quarter | NBA.com n.a |
| Recaps | 0021700178-lac-nop-recap GAME RECAP: Pelicans 111, Clippers 103 | NBA.com DeMarcus Cousins posts a double-double with 35 points and 15 rebounds to lead the Pelicans to a 111-103 win over the Clippers |

TABLE 1-continued (illustrating video types and URL and patterns).

| Video Tye | {URL last segment/Title/Description}, Textural Patterns |
|---|---|
| Player highlights | 20141211-westbrook-highlights.nba Westbrook Drops 26 | NBA.com Russell Westbrook scores 26 points with 8 assists and 7 rebounds to lead the Thunder over the Cavaliers 20181116-nightly-notable |
| Nightly notable | Nightly Notable: Anthony Davis | NBA.com Anthony Davis puts up a dominant performance scoring a season-high 43 points with 17 boards, 5 dimes and a block versus New York |
| Top 5 | 2qmrlOE Thursday's Top 5 Plays | NBA.com Take a look at the top five plays from Thursday's playoff action |

In some embodiments, the action tags of the video can be determined prior to execution of Step 410 or Process 400. In some embodiments, the action tags can be identified based on analysis of text from sports hosting website and/or Wikipedia®, for example (e.g., game log data).

Action tags can correspond to types of actions for particular sports. For example, for basketball, action tags can include, but are not limited to, dunk, lay-up, jump shot (or jumper), and the like. In a football example, action tags can include, but are not limited to, tackle, touchdown, penalty, and the like.

In some embodiments, each video belongs to a particular type of game which can be identified through the metadata associated with the video. The set of action tags can correspond to, but is not limited to particular players, particular time periods (e.g., which quarter), particular teams, and the like, or some combination thereof. For example, a dunk or 3-pointer can correspond to events in the 3rd or 4th quarter by Luka Doncic from team Detroit or team Dallas (e.g., shots made by Luka Doncic during the $3^{rd}$ or $4^{th}$ quarter of a game between Detroit and Dallas).

In Step 622, the p-b-p text for the video (e.g., a game) is identified. This is performed by using title or description of the video or team names identified by recognizing text through application of the trained model (from Step 406) and determining the unique identifier of a game which leads to the corresponding p-b-p text for the video.

Figure 6C:
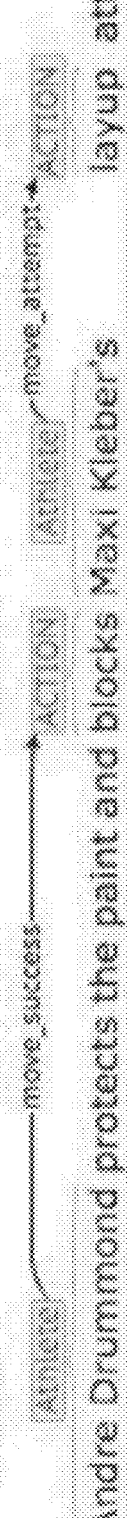

In Step 624, the set of video action tags are identified from the p-b-p text. The identification can be performed based on, but not limited to, special natural language processing (NLP) technique called relation extraction (player connected to action). An example of this is illustrated in FIG. 6C. [reference figure]. This provides the candidate p-b-p text segments of actions associated with the player. Time and quarter from each p-b-p text segment is identified and aligned with time point in video based on time and quarter which is recognized from video frames through application of the trained model (from Step 406) as detailed in Step 618. In some embodiments, the full process discussed herein is carried in the similar manner as explained in FIG. 6A.

In Step 626, as a result of the comparison and matching in Step 626, video segments that are "watch-worthy" are identified. In some embodiments, segments are at least n seconds long (a predetermined number of seconds) and continuous in order to adequately capture (or cover) the action referenced by an action tag. These are a product of fine-grained, OCR analysis that determines high-quality, high-interest content that will drive user activity and increase user experience.

According to some embodiments, the generated one-to-one mappings between video frames and text commentary (within p-b-p text, as illustrated in FIG. 5D) may not produce video segments that adequately or properly capture/cover the action. This occurs because p-b-p text record logs of almost all the key events/actions which occur in a full game, whereas highlight videos drop visuals for some of the less interesting events/actions during the editing phase. This causes quick scene transitions in highlight videos. Along with this, there exist some uneven delays between the point when the action actually occurred and when it got logged in p-b-p records.

Thus, the mapping in Step 626 involves mapping commentaries from the p-b-p text to a video point, time_v, based on the recognized clock/scoreboard time, time_c. However, having a scene transition in a highlight clip just a few seconds (say 1-3 sec) before time_v can lead to generally incorrect mappings. Thus, removing such incorrect mappings are crucial while dealing with highlights, whereas generating mappings from full game videos do not require this step.

In some embodiments, therefore, Step 626 can involve filtering out mappings which are mapped at video point, time_v, but do not have at least 't' seconds long continuous scene (e.g., time_v-t1 to time_v-t2). To ensure continuity, engine 300 can check the duration of the recognized time sequence proximate to the mapped point, which requires an extremely accurate OCR (high precision and high recall—the OCR trained model). As evidenced herein, the disclosed OCR sequence-based approach is more accurate and efficient than Ffmpeg-based-video slicing since the disclosed framework does not require any thresholding due to the trained models (developed from Steps 404-406 and FIG. 5A).

Turning back to FIG. 4, Process 400 continued from Step 410 to Step 412 where the determined video segment(s) from sub-step 610 of Step 410 is output (or provided over a network for access by users). Thus, Step 412 outputs at least one segment based on the fine-grained recognition operations via the trained OCR model.

According to some embodiments, the data related to the determined/output video segment(s) are fed back to Step 406 for further training of the OCR prediction model(s).

The output from Step 412, for example, enables access to the at least one video segment on an interface, such as, but not limited to, a webpage (e.g., a page hosted by Verizon®)) or an application that enables content consumption by a user. Step 414. Thus, in Step 414, engine 300 facilitates access to the output video segment(s) by either direct interaction with the segment(s) or via a URL associated with the segment(s). Such facilitation can be, but is not limited to, posting to a webpage, sharing on social media, sending within a message to a user's inbox, and the like, or some combination thereof. Step 414 can also enable, as discussed above, in-video search, video scrubbing, video thumbnail generation or selection, deep linking of players and events in videos, generating in-video descriptions, content-based recommendation graphs, and the like, or some combination thereof.

FIG. 7 is a work flow process 700 for serving or providing related digital media content based on the information associated with an event (or action(s)) detected within an identified video, as discussed above in relation to FIGS. 4-6C. In some embodiments, the provided content can be associated with or comprising advertisements (e.g., digital advertisement content). Such information can be referred to as "event information" for reference purposes only.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises digital content relaying promotional content provided by a network associated third party.

In Step 702, event information is identified. This information can be derived, determined, based on or otherwise identified from the steps of Process 400 (and/or its sub-processes of FIGS. 5A and 6), as discussed above.

For purposes of this disclosure, Process 700 will refer to event from a single video; however, it should not be construed as limiting, as any number of events and/or videos, can form such basis, without departing from the scope of the present disclosure.

In Step 704, a context is determined based on the identified event information. This context forms a basis for serving content related to the event information. For example, the context can be determined based on analysis of the action being performed in the event, and/or the actors in the event and their associations. For example, if a player plays for the New York Yankees® and hits a homerun, the context can be associated with the NBA®, and the football team in the Bronx.

In some embodiments, the identification of the context from Step 704 can occur before, during and/or after the analysis detailed above with respect to Process 400 and its sub-processes/steps, or it can be a separate process altogether, or some combination thereof.

In Step 706, the determined context is communicated (or shared) with a content providing platform comprising a server and database (e.g., content server 106 and content database 107, and/or advertisement server 130 and ad database). Upon receipt of the context, the server performs (e.g., is caused to perform as per instructions received from the device executing the engine 300) a search for a relevant digital content within the associated database. The search for the content is based at least on the identified context.

In Step 708, the server searches the database for a digital content item(s) that matches the identified context. In Step 710, a content item is selected (or retrieved) based on the results of Step 708.

In some embodiments, the selected content item can be modified to conform to attributes or capabilities of a device, browser user interface (UI), video, page, interface, platform, application or method upon which a user will be viewing the media associated with the detected event. In some embodiments, the selected content item is shared or communicated via the application or browser the user is utilizing to consume a video and its included detected event. Step 712. In some embodiments, the selected content item is sent directly to a user computing device for display on a device and/or within a user interface (UI) displayed on the device's display (e.g., within the browser window and/or within an inbox of a high-security property). In some embodiments, the selected content item is displayed within a portion of the interface or within an overlaying or pop-up interface associated with a rendering interface displayed on the device.

In some embodiments, the selected content item can be displayed as part of a coupon/ad clipping, coupon/ad recommendation and/or coupon/ad summarization interface.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

identifying a video, the video comprising content corresponding to an event;

analyzing the video, and determining attributes of the video, the attributes corresponding to characteristics of playback of the video when rendered;

performing a batch prediction, based on the determined attributes of the video, the batch prediction corresponding to a position within frames of the video related to a clock;

determining, based on further analysis of the video, a set of frames corresponding to an action represented within the content of the video;

analyzing the set of frames based on the batch prediction, and determining a time period associated with the action; and generating a video segment as a highlight of the video, the video segment comprising the set of frames corresponding to the determined time period.

2. The method of claim 1, further comprising:

analyzing, via a multimedia stream analyzer, the video by probing the video to identify the characteristics of playback, the characteristics of playback comprising at least one of resolution, frame rate, image sequences, frame height and width, length of the video and publish date.

3. The method of claim 1, further comprising:

decoding the frames of the video via a single shot detector (SSD) model; and determining the set of frames based further on the decoding via the SSD model.

4. The method of claim 1, further comprising:

identifying play-by-play text related to the video; and performing the further analysis of the video based on the play-by-play text.

5. The method of claim 1, further comprising:

analyzing the frames of the video, and determining bounding boxes within each frame corresponding to the clock;

clustering the set of frames based on the bounding boxes; and generating the video segment based on the clustering.

6. The method of claim 5, further comprising:

performing text recognition within the bounding boxes within each frame; and performing the clustering based on a result of the text recognition for the set of frames.

7. The method of claim 1, further comprising:

receiving a request for content related to an item within the video; and generating the video segment based on the item identified by the request, wherein the item corresponds to at least one of a type of action, a particular player, a particular time period, and a particular team.

8. The method of claim 1, further comprising:

requesting, over a network, third party digital content based at least on information related to the video segment;

receiving, over the network, the third party digital content; and communicating, over the network, the third party digital content for display along with the video segments.

9. A non-transitory computer-readable storage medium tangibly encoded with computer-executable instructions, that when executed by a processor associated with a device, performs a method comprising:

identifying a video, the video comprising content corresponding to an event;

analyzing the video, and determining attributes of the video, the attributes corresponding to characteristics of playback of the video when rendered;

performing a batch prediction, based on the determined attributes of the video, the batch prediction corresponding to a position within frames of the video related to a clock;

determining, based on further analysis of the video, a set of frames corresponding to an action represented within the content of the video;

analyzing the set of frames based on the batch prediction, and determining a time period associated with the action; and generating a video segment as a highlight of the video, the video segment comprising the set of frames corresponding to the determined time period.

10. The non-transitory computer-readable storage medium of claim 9, further comprising:

analyzing, via a multimedia stream analyzer, the video by probing the video to identify the characteristics of playback, the characteristics of playback comprising at least one of resolution, frame rate, image sequences, frame height and width, length of the video and publish date.

11. The non-transitory computer-readable storage medium of claim 9, further comprising:

decoding the frames of the video via a single shot detector (SSD) model; and determining the set of frames based further on the decoding via the SSD model.

12. The non-transitory computer-readable storage medium of claim 9, further comprising:

identifying play-by-play text related to the video; and performing the further analysis of the video based on the play-by-play text.

13. The non-transitory computer-readable storage medium of claim 9, further comprising:

analyzing the frames of the video, and determining bounding boxes within each frame corresponding to the clock;

clustering the set of frames based on the bounding boxes; and generating the video segment based on the clustering.

14. The non-transitory computer-readable storage medium of claim 13, further comprising:

performing text recognition within the bounding boxes within each frame; and performing the clustering based on a result of the text recognition for the set of frames.

15. The non-transitory computer-readable storage medium of claim 9, further comprising:

receiving a request for content related to an item within the video; and generating the video segment based on the item identified by the request, wherein the item corresponds to at least one of a type of action, a particular player, a particular time period, and a particular team.

16. A device comprising:

a processor configured to:

identify a video, the video comprising content corresponding to an event;

analyze the video, and determine attributes of the video, the attributes corresponding to characteristics of playback of the video when rendered;

perform a batch prediction, based on the determined attributes of the video, the batch prediction corresponding to a position within frames of the video related to a clock;

determine, based on further analysis of the video, a set of frames corresponding to an action represented within the content of the video;

analyze the set of frames based on the batch prediction, and determine a time period associated with the action; and generate a video segment as a highlight of the video, the video segment comprising the set of frames corresponding to the determined time period.

17. The device of claim 16, wherein the processor is configured to:

analyze, via a multimedia stream analyzer, the video by probing the video to identify the characteristics of playback, the characteristics of playback comprising at least one of resolution, frame rate, image sequences, frame height and width, length of the video and publish date.

18. The device of claim 16, wherein the processor is configured to:

decode the frames of the video via a single shot detector (SSD) model; and determine the set of frames based further on the decoding via the SSD model.

19. The device of claim 16, wherein the processor is configured to:

identify play-by-play text related to the video; and perform the further analysis of the video based on the play-by-play text.

20. The device of claim 16, wherein the processor is configured to:

analyze the frames of the video, and determine bounding boxes within each frame corresponding to the clock;

cluster the set of frames based on the bounding boxes; and generate the video segment based on the clustering.

* * * * *